United States Patent
Jeong

(10) Patent No.: US 9,943,785 B2
(45) Date of Patent: Apr. 17, 2018

(54) WATER PURIFIER

(71) Applicant: NANOPOLY CO., LTD., Gyeonggi-do (KR)

(72) Inventor: Gu Wan Jeong, Gyeonggi-do (KR)

(73) Assignee: NANOPOLY CO., LTD., Gyeonggi-Do (KR)

( * ) Notice: Subject to any disclaimer, the term of this patent is extended or adjusted under 35 U.S.C. 154(b) by 3 days.

(21) Appl. No.: 14/783,785

(22) PCT Filed: Aug. 12, 2014

(86) PCT No.: PCT/KR2014/007509
§ 371 (c)(1),
(2) Date: Oct. 9, 2015

(87) PCT Pub. No.: WO2015/023119
PCT Pub. Date: Feb. 19, 2015

(65) Prior Publication Data
US 2016/0151724 A1 Jun. 2, 2016

(30) Foreign Application Priority Data
Aug. 12, 2013 (KR) .................. 10-2013-0095235

(51) Int. Cl.
*B01D 29/56* (2006.01)
*B01D 39/20* (2006.01)
(Continued)

(52) U.S. Cl.
CPC ......... *B01D 29/56* (2013.01); *B01D 39/2027* (2013.01); *B01D 39/2068* (2013.01);
(Continued)

(58) Field of Classification Search
CPC ................ B01D 29/56; B01D 39/2027; B01D 39/2068; B01D 39/2072;
(Continued)

(56) References Cited

U.S. PATENT DOCUMENTS

| 2008/0110820 A1* | 5/2008 | Knipmeyer | C02F 1/003 210/474 |
| 2009/0001012 A1* | 1/2009 | Kepner | C02F 1/505 210/287 |
| 2012/0091070 A1* | 4/2012 | Sjauta | C02F 1/003 210/764 |

FOREIGN PATENT DOCUMENTS

| JP | 2004508184 | 3/2004 |
| KR | 2003902800000 | 7/2005 |

(Continued)

OTHER PUBLICATIONS

Machine translation of KR 101038939B1 to Park et al. Jun. 2011 (obtained from kipo Jun. 2017).*

*Primary Examiner* — Lucas Stelling
(74) *Attorney, Agent, or Firm* — IPLA P.A.; James E. Bame

(57) ABSTRACT

Disclosed is a water purifier including a first storage cistern in which an inlet for flowing in water is formed, a second storage cistern for storing the purified water and having a nozzle at the outside thereof, and a filter constituted by a ceramic filter, a cartridge filter, and a mineral filter and installed to the inside of the first storage cistern and the second storage cistern to filter the water flown in the first storage cistern and make the purified water flow in the second storage cistern, the water purifier comprises a ceramic filter formed as a mixture by mixing the conventional used silicon dioxide with its particle size of 1~100 micrometer with additionally one or two or more selected among silicon dioxide, tungsten, alumina ($Al_2O_3$), silver, zinc (Zn), white gold (PT), gold (Au), and titanium dioxide ($TiO_2$) with nano particle size.

2 Claims, 11 Drawing Sheets

(51) Int. Cl.
  *C02F 1/28* (2006.01)
  *C02F 1/50* (2006.01)
  *C02F 1/68* (2006.01)
  *C02F 1/00* (2006.01)

(52) U.S. Cl.
  CPC .......... *B01D 39/2072* (2013.01); *C02F 1/003* (2013.01); *C02F 1/281* (2013.01); *C02F 1/505* (2013.01); *C02F 1/68* (2013.01); *B01D 2239/1241* (2013.01); *C02F 2201/006* (2013.01); *C02F 2303/04* (2013.01); *C02F 2305/08* (2013.01)

(58) Field of Classification Search
  CPC .. B01D 2239/1241; C02F 1/003; C02F 1/281; C02F 1/505; C02F 1/68; C02F 2201/006; C02F 2303/04; C02F 2305/08
  See application file for complete search history.

(56) References Cited

FOREIGN PATENT DOCUMENTS

| | | | |
|---|---|---|---|
| KR | 2004215110000 | 7/2006 | |
| KR | 1020090008331 | 1/2009 | |
| KR | 101038939 B1 * | 6/2011 | ................ C02F 1/68 |
| KR | 20120128915 | 11/2012 | |

* cited by examiner

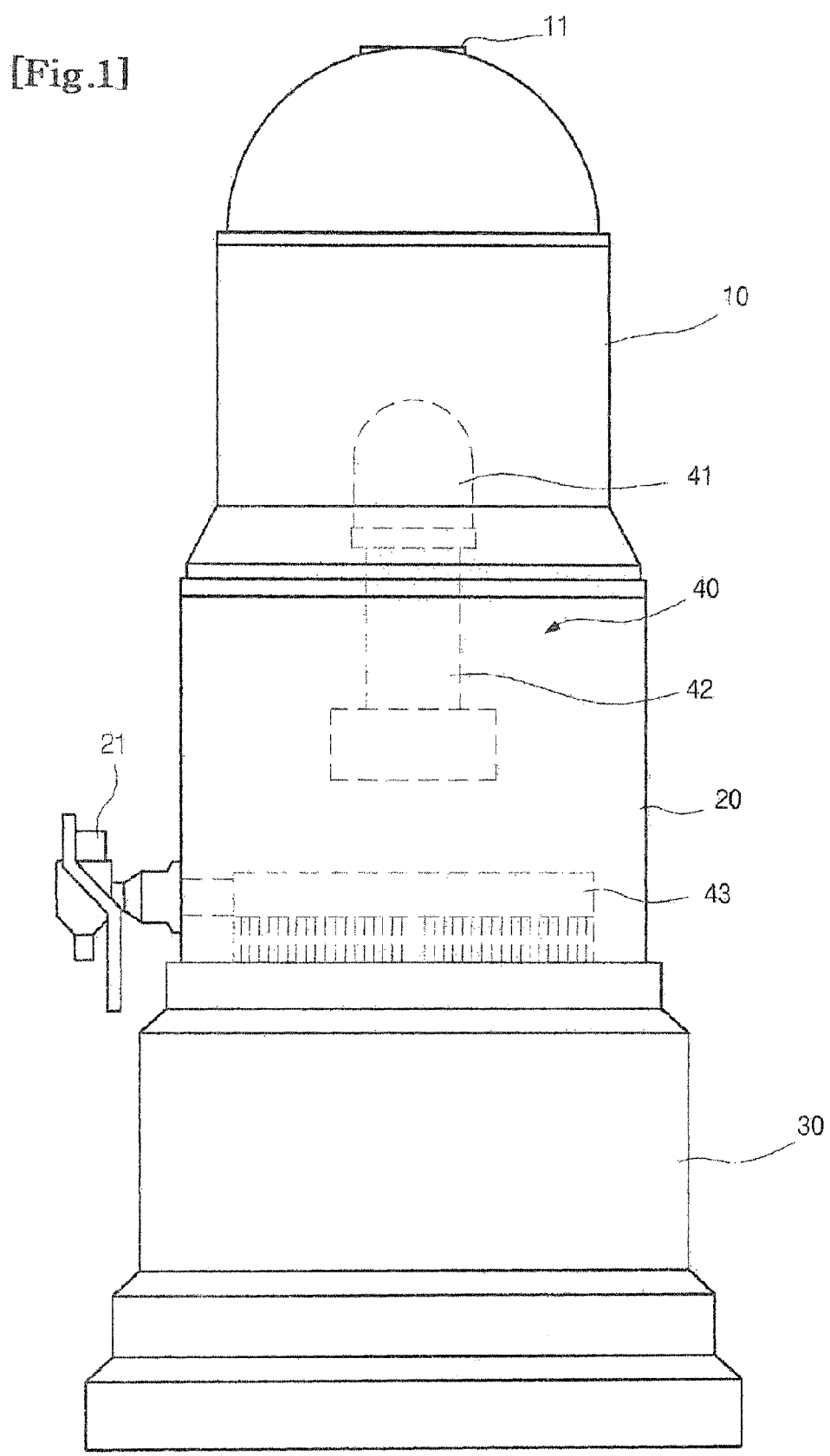
[Fig.1]

[ FIG. 2 ]
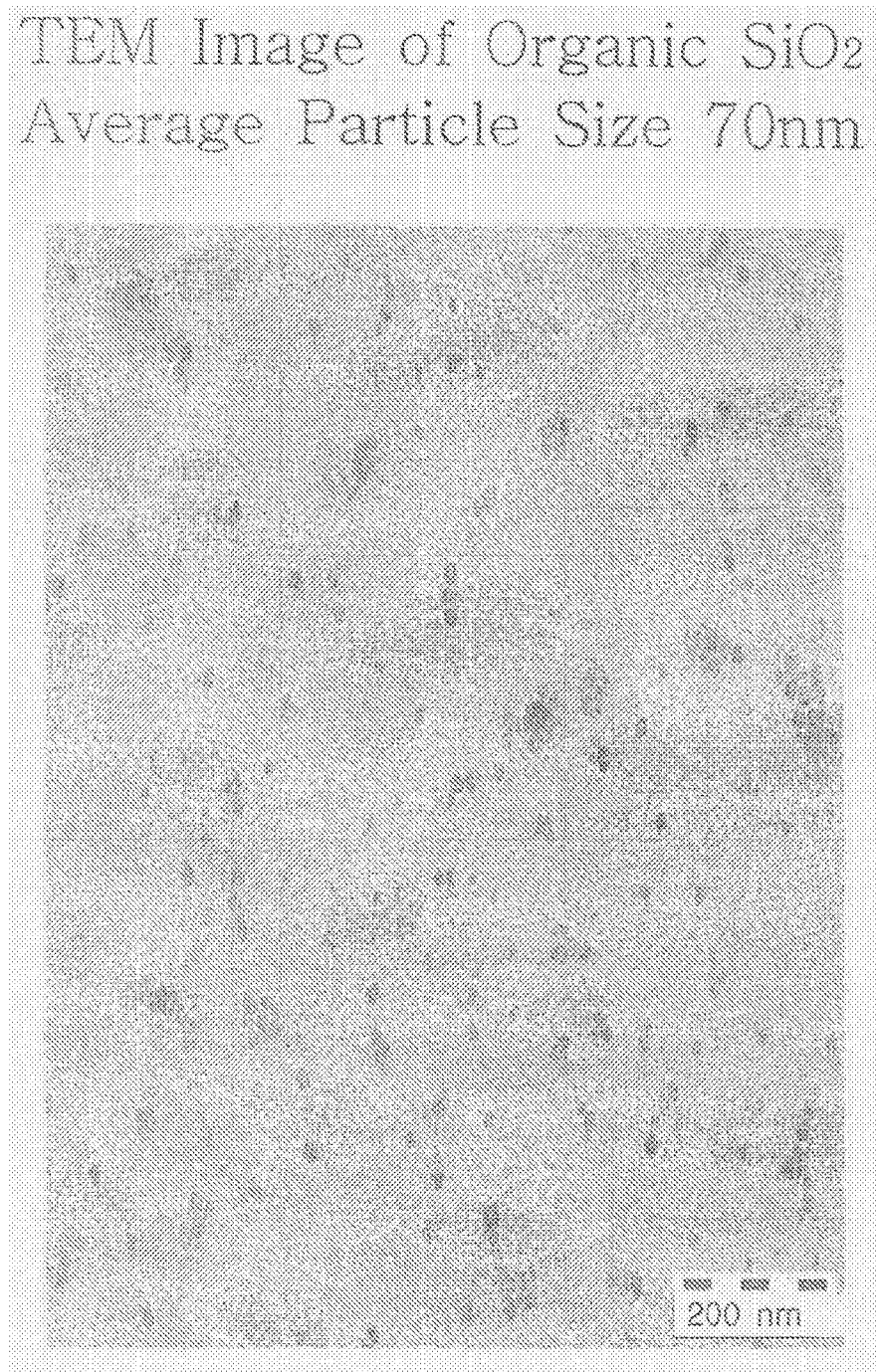

[ FIG. 3 ]
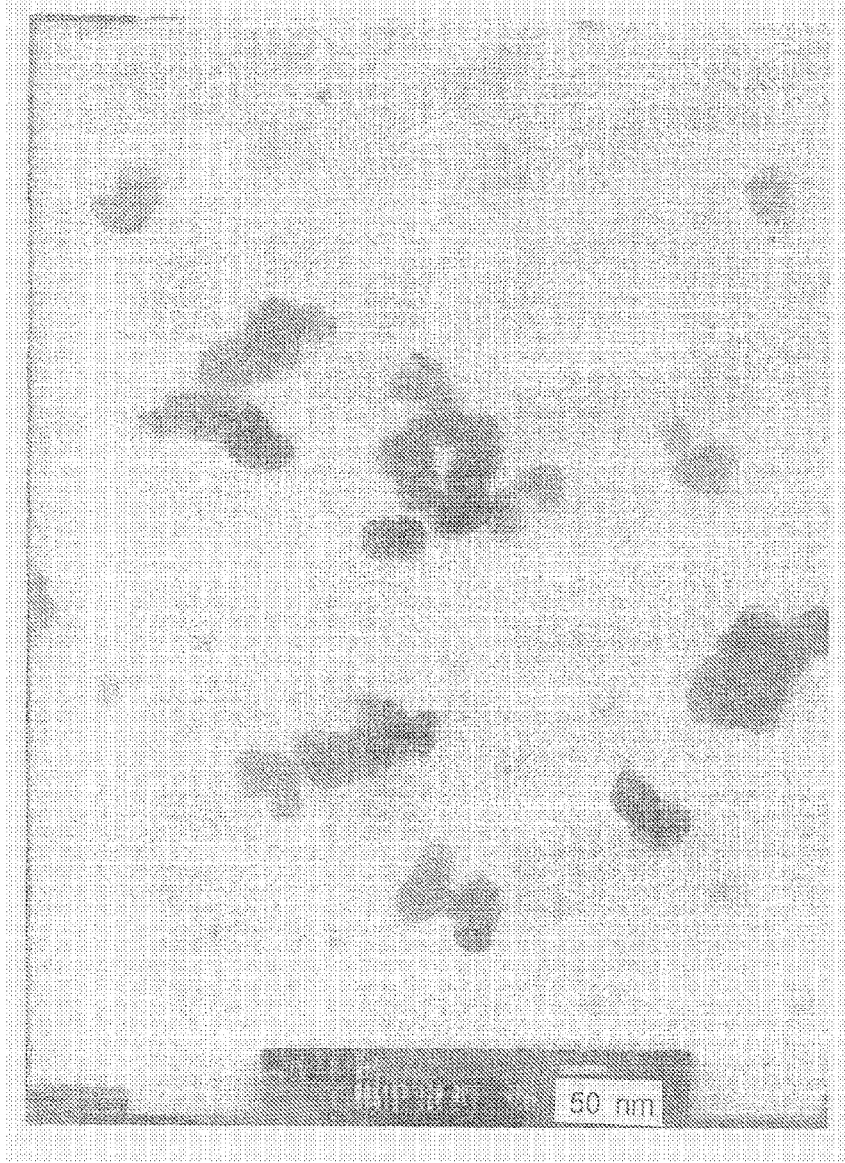

[ FIG. 4 ]
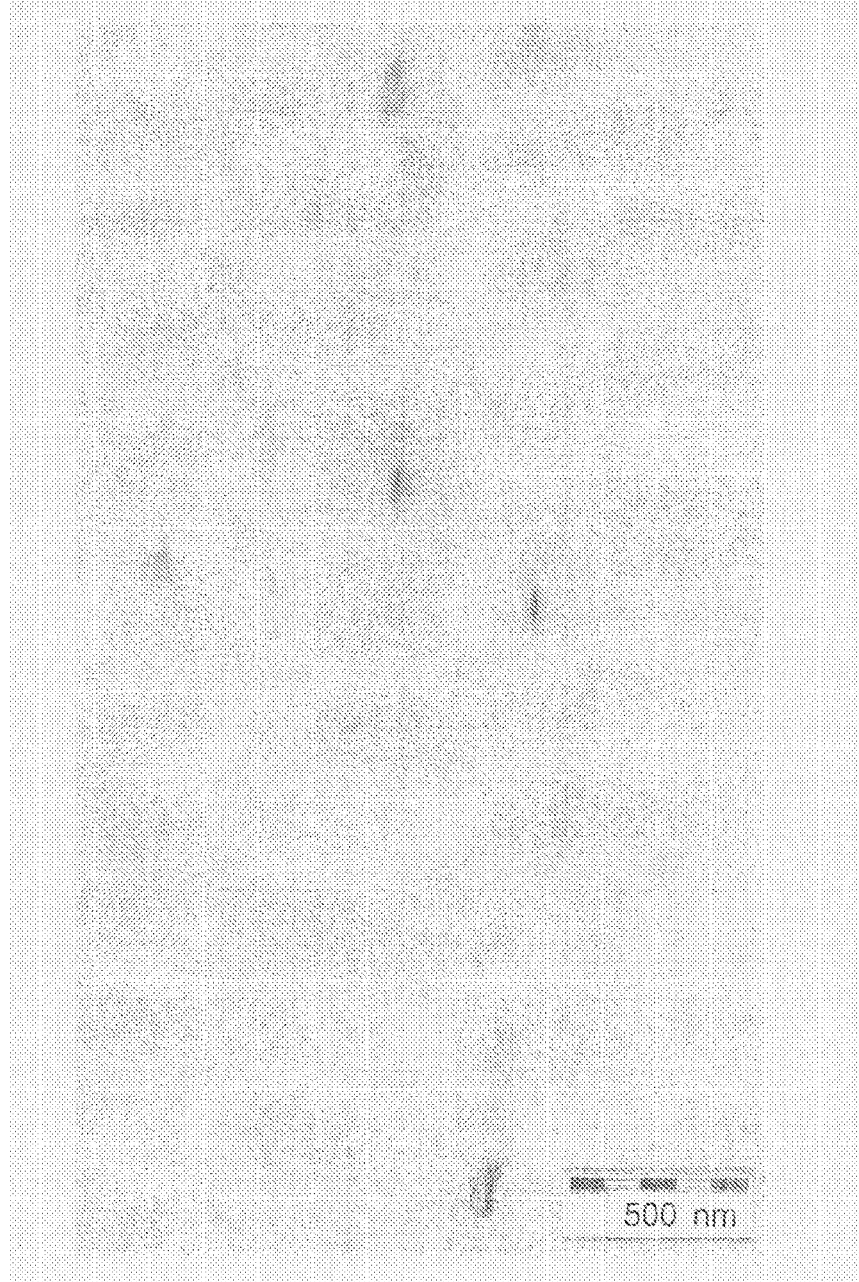

[ FIG. 5 ]
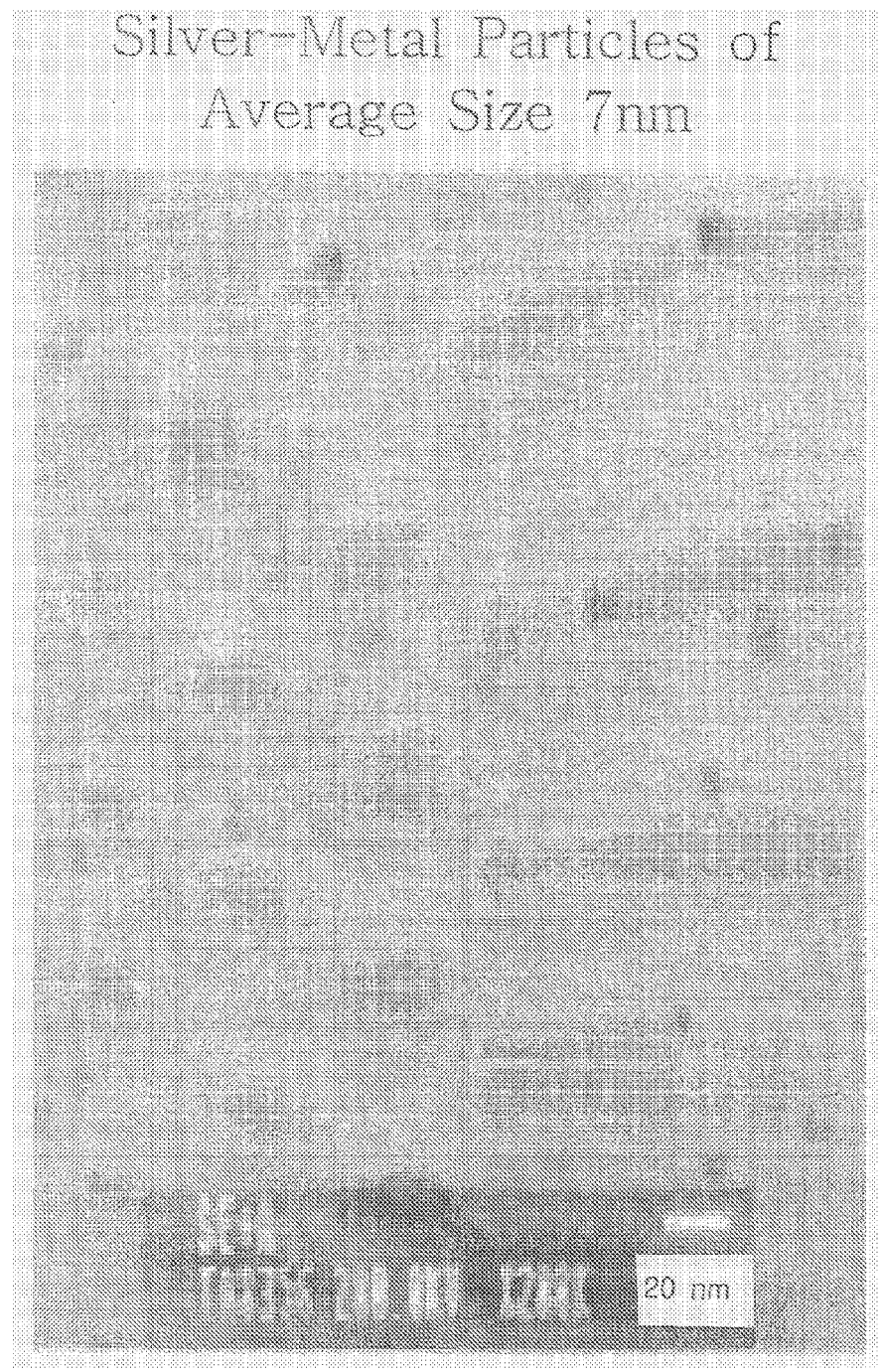

[ FIG. 6 ]
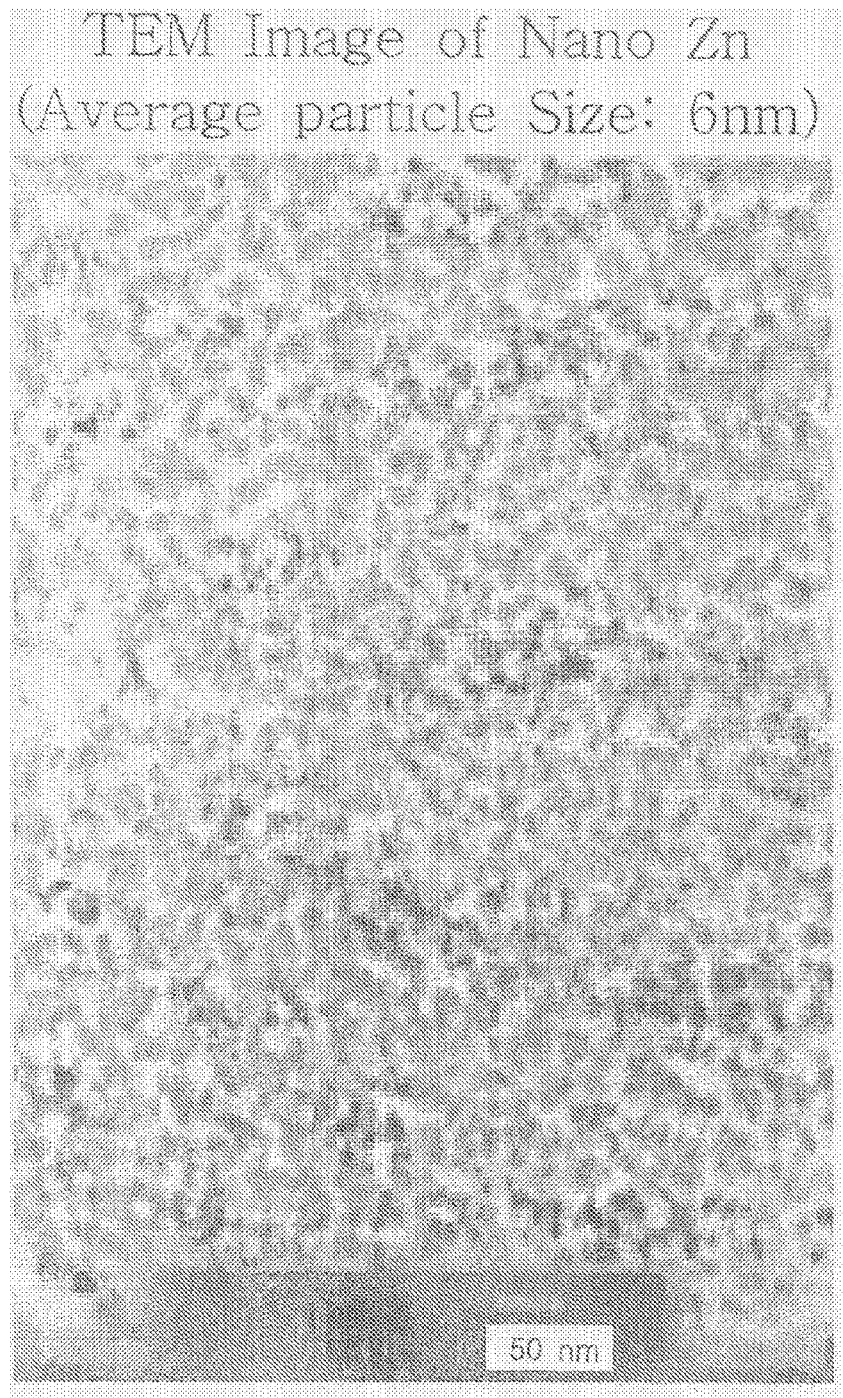

[ FIG. 7 ]
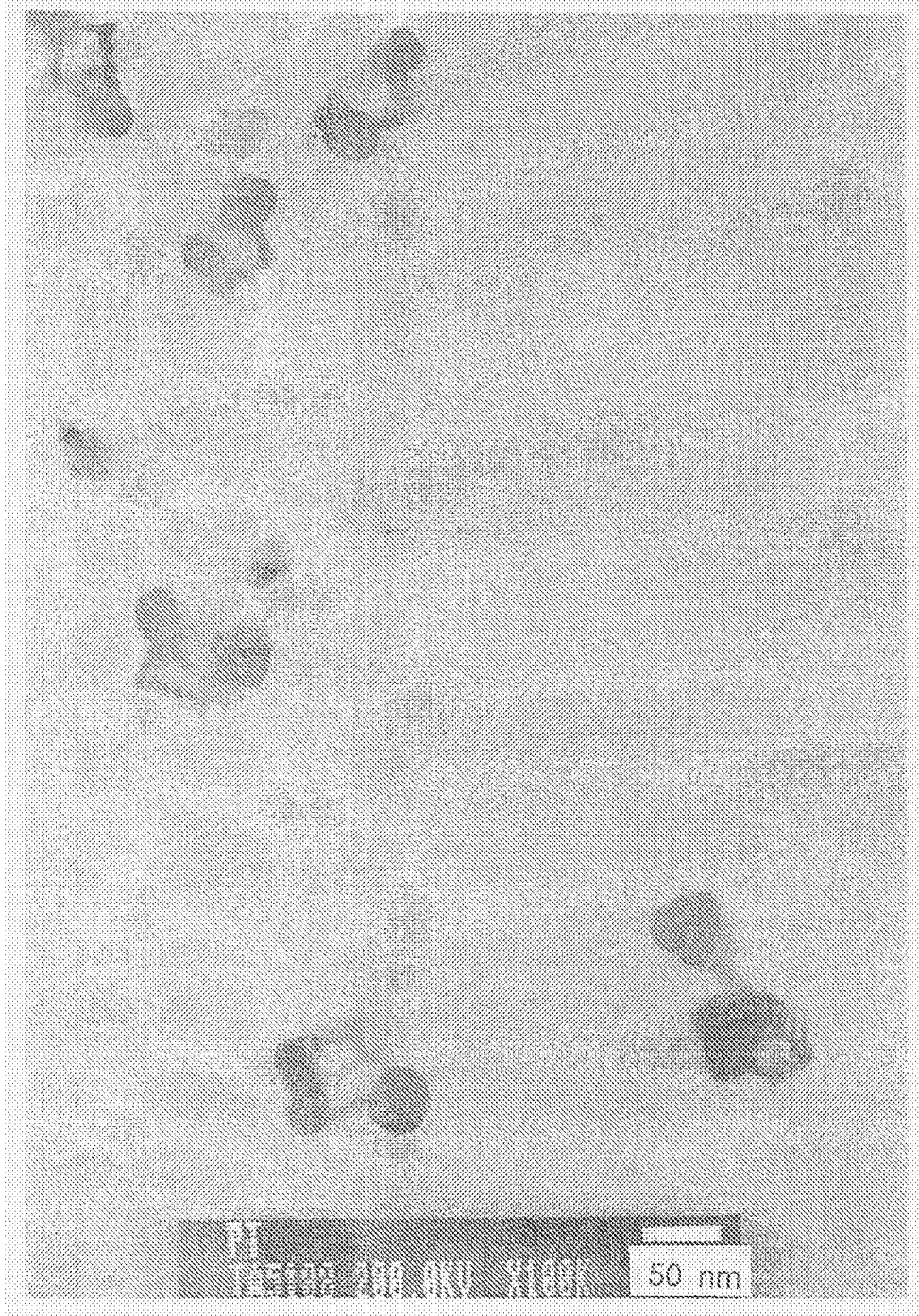

[ FIG. 8 ]
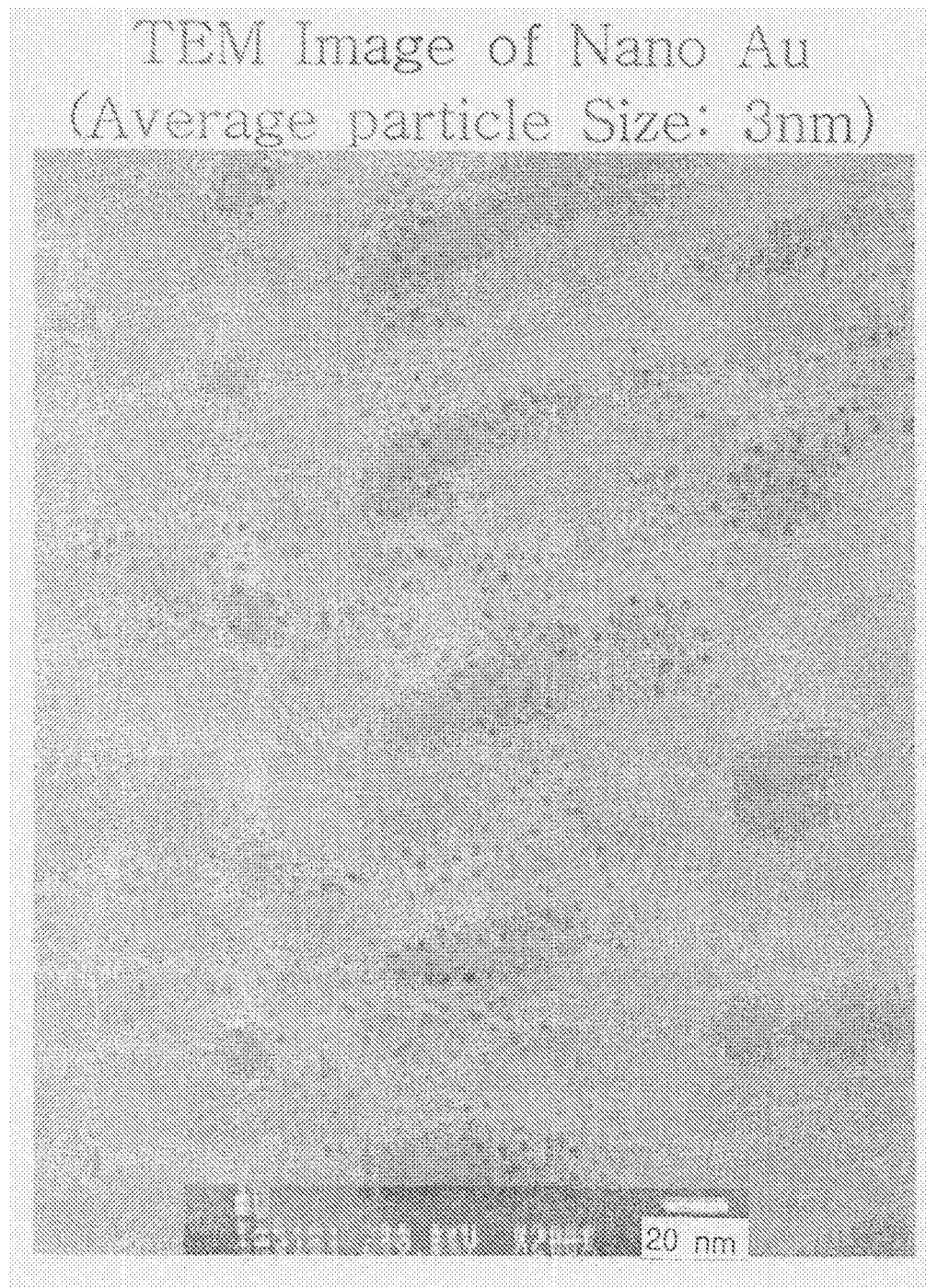

[ FIG. 9 ]
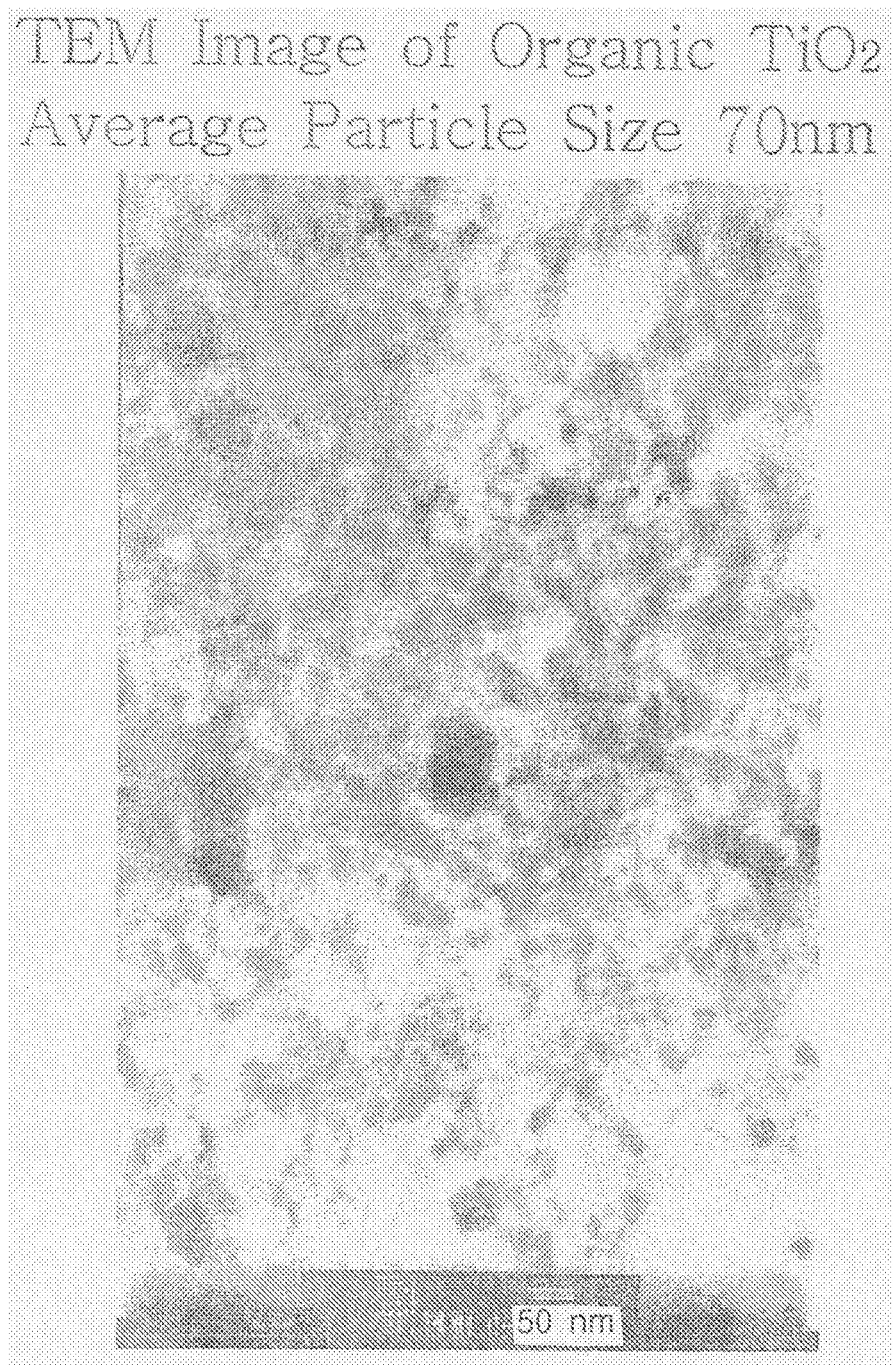

[ FIG. 10 ]

| Division | | Item (Model) | Antimicrobial Efficacy (%) (Percent Reduction of Bacteria) | | | | Test Method |
|---|---|---|---|---|---|---|---|
| 1. Water Purifier System (Sterilizing Water Purifier) | | NANOMIX-PF1200 (Contained Filter) | Division | 100ml | 500ml | 1L | - After filtration, tried to test of antimicrobial about each received water (100ml, 500ml, 1L) instantly<br>- Inoculating Number of Bacteria<br>S. Aureus 18,000,000.<br>E. Coli 16,000,000. |
| | | | S. Aureus ATCC6583 | 99.8 | 99.7 | 99.7 | |
| | | | E. Coli ATCC25922 | 99.8 | 99.8 | 99.8 | |
| 2. Filter | | Ceramic Filter-SF1 (1st Filter) | Division | 100ml | 500ml | 1L | - After filtration, tried to test of antimicrobial about each received water (100ml, 500ml, 1L) instantly<br>- Inoculating Number of Bacteria<br>S. Aureus -180,000.<br>E. Coli - 160,000. |
| | | | S. Aureus ATCC6583 | 99.9 | 99.9 | 99.9 | |
| | | | E. Coli ATCC25922 | 99.9 | 99.9 | 99.9 | |
| | | Cartridge Filter-SF2 (2nd Filter) | Division | 100ml | 500ml | 1L | - After filtration, tried to test of antimicrobial about each received water (100ml, 500ml, 1L) instantly<br>- Inoculating Number of Bacteria<br>S. Aureus -160,000.<br>E. Coli - 190,000. |
| | | | S. Aureus ATCC6583 | 99.9 | 99.9 | 99.9 | |
| | | | E. Coli ATCC25922 | 99.9 | 99.9 | 99.9 | |
| | | Mineral Filter-SF3 (3rd Filter) | Division | 1hr | 3hrs | 5hrs | - After Inoculating, tried to test of antimicrobial about each the time elapsed (1hr, 3hrs, 5hrs)<br>- Inoculating Number of Bacteria<br>S. Aureus -160,000.<br>E. Coli - 190,000. |
| | | | S. Aureus ATCC6583 | 68.3 | 91.3 | 99.4 | |
| | | | E. Coli ATCC25922 | 70.5 | 98.8 | 99.7 | |

[ FIG. 11 ]

| Division | Item (Model) | Durability | Specification | Image |
|---|---|---|---|---|
| 1. Water Purifier System (Sterilizing Water Purifier) | NANOMIX-PF1200 (Contained Filters) -Capability: 2.3L/Hr | Body Pot- 5years | · Water Tank-12kg<br>· Natural filtration System<br>· Harmless Plastic Body-SAN,ABS,PP | |
| 2. Filter | Ceramic Filter-SF1 (1st Filter) | 6 Months | · Nano Treated Filter<br>· Bacteria killed within 10 seconds<br>· Surface Cleaning System |  |
| | Cartridge Filter-SF2 (2nd Filter) | 6 Months | · Nano Treated Filter<br>· Multi-layer Filter: Carbon + Zeolite + SiO2 +Ion Ex- Resin<br>· Bacteria killed within 10 seconds | 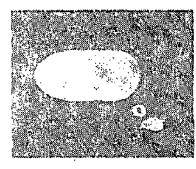 |
| | Mineral Filter-SF3 (3rd Filter) | 3years | · Nano Treated Filter<br>· Mineral Stone<br>· Bacteria killed within 5Hrs | 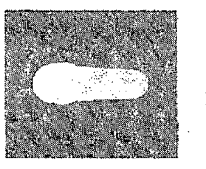 |

WATER PURIFIER

TECHNICAL FIELD

The present invention relates to a water purifier in which a sterilization function is provided to a filter of the water purifier with a natural filtering type and a storage cistern for storing the filtered water, thereby inhibiting the increase of a microorganism.

BACKGROUND ART

In an office and a household, a water purifier is used for sterilizing and purifying foreign bodies or bacteria in water.

There are a variety of types of water purifiers. In general, in a water purifier, it is connected with a water pipe, water is purified through a plurality of filters, and the purified water is stored to a storage cistern. Also, a water purifier includes a first storage cistern to which water for purifying is stored, a second storage cistern having purified water, and a filter installed between the first storage cistern and the second storage cistern, so that the water purified by the filter is stored to the second storage cistern.

However, in the water purifier having the first storage cistern, second storage cistern, and the filter between the first storage cistern and the second storage cistern, the water is first stored to the first storage cistern and then the water stored to the first storage cistern is stored to the second storage cistern through a ceramic filter and a cartridge filter.

In the water purifier as described above, there is a problem: since water is stored to the first storage cistern for a long time, the increase of a microorganism such as a colon *bacillus* occurred and drinking water is polluted, so that the human body also can be harmed.

And, there is another problem: since the water which is purified through the filter and stored to the second storage cistern is stored to the second storage cistern for a long time, a microorganism can be increased.

Also, there is another problem: in the filter for filtering the water of the first storage cistern and then providing it to the second storage cistern, a microorganism occurs and propagates in the inside of the filter.

Accordingly, in an area such as Africa and so on in which there is no electricity and water is scarce, the natural filtering type of water purifier has been used, however, a water purifier having functions for inhibiting the increase of a microorganism and sterilizing bacteria is keenly required. That is, the non-purified water such as the rainwater and the water of a brook and so on is used, people are exposed to various waterborne infection. However, a water purifier according to the present invention can overcome these problems and provide people with safe drinking water.

THE CONVENTIONAL CITED REFERENCE

Korean Patent Application No. 10-2011-46853

DISCLOSURE OF INVENTION

Technical Problem

Accordingly, it is an object of the present invention to provide a water purifier in which bacteria of a storage cistern to which water for purifying is stored, a storage cistern having purified water, and a filter for filtering water can be sterilized and removed.

Another object of the present invention is to provide a water purifier in which a ceramic filter, a cartridge filter, and a mineral filter have a sterilization function.

Another object of the present invention is to provide a water purifier in which an instant sterilizing force over 99% is maintained.

Solution to Problem

According to a first aspect of the present invention, in a water purifier including a first storage cistern in which an inlet for flowing in water is formed, a second storage cistern for storing the purified water and having a nozzle at the outside thereof, and a filter constituted by a ceramic filter, a cartridge filter, and a mineral filter and installed to the inside of the first storage cistern and the second storage cistern to filter the water flown in the first storage cistern and make the purified water flow in the second storage cistern, the water purifier comprises a ceramic filter formed as a mixture by mixing the conventional used silicon dioxide with its particle size of 1~100 micrometer with additionally one or two or more selected among silicon dioxide, tungsten, alumina (Al2O3), silver, zinc (Zn), white gold (PT), gold (Au), and titanium dioxide (TiO2) with nano particle size, wherein the mixing ratio of the mixture as follows: the particle size of silicon dioxide is 1-100 nanometer and its use concentration is 1-1000 ppm, the particle size of tungsten is 0.5-50 nanometer and its use concentration is 1-500 ppm, the particle size of alumina is 1-100 nanometer and its use concentration is 50-500 ppm, the particle size of silver is 1-10 nanometer and its use concentration is 5-50 ppm, the particle size of zinc is 1-100 nanometer and its use concentration is 50-500 ppm, the particle size of white gold is 1-50 nanometer and its use concentration is 1-10 ppm, the particle size of gold is 1-20 nanometer and its use concentration is 1-10 ppm, and the particle size of titanium dioxide is 1-100 nanometer and its use concentration is 50-500 ppm.

According to a second aspect of the present invention, in a water purifier including a first storage cistern in which an inlet for flowing in water is formed, a second storage cistern for storing the purified water and having a nozzle at the outside thereof, and a filter constituted by a ceramic filter, a cartridge filter, and a mineral filter and installed to the inside of the first storage cistern and the second storage cistern to filter the water flown in the first storage cistern and make the purified water flow in the second storage cistern, the water purifier comprises a cartridge filter in which silver-coated carbon filter is equipped with its inside and the silver coated on the surface of the carbon filter is formed by silver nano particles with the size of 1-10 nanometer and coated by the concentration of 5-150 ppm.

According to a third aspect of the present invention, a water purifier comprises a mineral filter installed at the bottom of the second storage cistern, wherein one or two or more among silver (Ag), white gold (PT), and gold (Au) are mixed selectively with the mineral containing barley stone, and then the mineral filter is coated by surface-treatment through the mixture, and the surface-treatment method is performed by a method disclosed in the conventional technique (Korean Invention Patent No. 10-0767737). (According to this technique, the dried stone material or wood is impregnated into the mixture containing nano particle such as silver or titanium dioxide with 100~1000 ppm or 0.2~0.9 wt % (percentage) of metal nano particles of silver or titanium dioxide compared to the wt % (percentage) of solution.).

Preferably, in nano particles to be used, the particle size of silver (Ag) is 1-10 nm (nanometer) and its use concentration is 50-200 ppm, the particle size of white gold (PT) is 1-50 nm (nanometer) and its use concentration is 1-10 ppm, and the particle size of gold (Au) is 1-20 nm (nanometer) and its use concentration is 1-10 ppm.

According to a fourth aspect of the present invention, in a water purifier including a first storage cistern in which an inlet for flowing in water is formed, a second storage cistern for storing the purified water and having a nozzle at the outside thereof, and a filter constituted by a ceramic filter, a cartridge filter, and a mineral filter and installed to the inside of the first storage cistern and the second storage cistern to filter the water flown in the first storage cistern and make the purified water flow in the second storage cistern, the water purifier comprises a ceramic filter formed as a mixture by mixing the conventional used silicon dioxide with its particle size of 1~100 micrometer with additionally one or two or more selected among silicon dioxide, tungsten, alumina (Al2O3), silver, zinc (Zn), white gold (PT), gold (Au), and titanium dioxide (TiO2) with nano particle size, wherein the mixing ratio of the mixture as follows: the particle size of silicon dioxide is 1-100 nanometer and its use concentration is 1-1000 ppm, the particle size of tungsten is 0.5-50 nanometer and its use concentration is 1-500 ppm, the particle size of alumina is 1-100 nanometer and its use concentration is 50-500 ppm, the particle size of silver is 1-10 nanometer and its use concentration is 5-50 ppm, the particle size of zinc is 1-100 nanometer and its use concentration is 50-500 ppm, the particle size of white gold is 1-50 nanometer and its use concentration is 1-10 ppm, the particle size of gold is 1-20 nanometer and its use concentration is 1-10 ppm, the particle size of titanium dioxide is 1-100 nanometer and its use concentration is 50-500 ppm, wherein the water purifier comprises a cartridge filter in which silver-coated carbon filter is equipped with its inside and the silver coated on the surface of the carbon filter is formed by silver nano particles with the size of 1-10 nanometer and coated by the concentration of 5-150 ppm, wherein the water purifier comprises a mineral filter installed at the bottom of the second storage cistern, wherein one or two or more among silver (Ag), white gold (PT), and gold (Au) are mixed selectively with the mineral containing barley stone, and then the mineral filter is coated by surface-treatment through the mixture, and wherein, in nano particles to be used in the mixture, the particle size of silver (Ag) is 1-10 nm (nanometer) and its use concentration is 50-200 ppm, the particle size of white gold (PT) is 1-50 nm (nanometer) and its use concentration is 1-10 ppm, and the particle size of gold (Au) is 1-20 nm (nanometer) and its use concentration is 1-10 ppm.

Advantageous Effects of Invention

According to a water purifier of the present invention, there is an advantage that bacteria of a storage cistern to which water for purifying is stored, a storage cistern having purified water, and a filter for filtering water can be sterilized and removed.

Also, in an area such as Africa and so on in which there is no electricity and water is scarce, the natural filtering type of water purifier has been used and there is no a function for inhibiting the increase of microorganism and sterilizing water. However, according to a water purifier of the present invention, there is another advantage that a water purifier having functions for inhibiting the increase of a microorganism and sterilizing bacteria is purified water such as the rainwater and the water of a brook and so on by a natural filtering method without electricity. Thus, people use the sterilized water as drinking water and so can be prevented from various waterborne infection.

BRIEF DESCRIPTION OF DRAWINGS

FIG. 1 is a construction view of a water purifier according to an embodiment of the present invention.

FIG. 2 is a TEM (Transmission Electron Microscope) photograph showing the distribution of nano particles of silicon dioxide according to an embodiment of the present invention.

FIG. 3 is a TEM (Transmission Electron Microscope) photograph showing the distribution of nano particles of tungsten according to an embodiment of the present invention.

FIG. 4 is a TEM (Transmission Electron Microscope) photograph showing the distribution of nano particles of alumina according to an embodiment of the present invention.

FIG. 5 is a TEM (Transmission Electron Microscope) photograph showing the distribution of nano particles of silver according to an embodiment of the present invention.

FIG. 6 is a TEM (Transmission Electron Microscope) photograph showing the distribution of nano particles of zinc according to an embodiment of the present invention.

FIG. 7 is a TEM (Transmission Electron Microscope) photograph showing the distribution of nano particles of white gold according to an embodiment of the present invention.

FIG. 8 is a TEM (Transmission Electron Microscope) photograph showing the distribution of nano particles of gold according to an embodiment of the present invention.

FIG. 9 is a TEM (Transmission Electron Microscope) photograph showing the distribution of nano particles of titanium dioxide according to an embodiment of the present invention.

FIG. 10 is an anti-bacterial test table of a water purifier according to the present invention.

FIG. 11 shows a specification of a test water purifier according to the present invention.

BEST MODE FOR CARRYING OUT THE INVENTION

Hereinafter, preferable embodiments of the present invention will be described with reference to the accompanying drawings. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art.

FIG. 1 is a construction view of a water purifier according to an embodiment of the present invention.

As shown in FIG. 1, a water purifier includes a first storage cistern 10, a second storage cistern 20, a filter 40 for purifying water, and a support 30 for supporting the second storage cistern 20.

An inlet 11 is formed at the upper portion of the first storage cistern 10 in order to flow water into the inside of the first storage cistern 10. Water before performing a purification process is flowing and stored into the inside of the first storage cistern 10. The first storage cistern 10 is combined with the upper side of the second storage cistern 20.

A nozzle 21 is equipped with a lower outside of the second storage cistern 20 in order to discharge water of the second storage cistern 20. Water purified by a filter 40 through the first storage cistern 10 is flowing and stored into the second storage cistern 20. The second storage cistern 20 is combined with the upper side of the support 30.

The filter 40 includes a ceramic filter 41, a cartridge filter 42, and a mineral filter 43. The ceramic filter 41 is equipped with a lower side of the first storage cistern 10. Though not shown in Figures, an inlet hole is formed between the first storage cistern 10 and the second storage cistern 20 in order to flow water stored to the first storage cistern 10 into the second storage cistern 20. The ceramic filter 41 is combined with the upper side of the inlet hole.

Though not shown in Figures, vacant spaces are formed at the inside of the ceramic filter. A discharge hole is formed at the lower side of the ceramic filter and connected with a vacant space of the ceramic filter. Minute air holes with its diameter of 0.4~0.6 micrometer are formed at the ceramic filter.

Water is absorbed into a space of the inside of the ceramic filter through the minute air holes and the absorbed water flows into a cartridge filter through the discharge hole.

The cartridge filter 42 is combined with the lower side of the ceramic filter 41 which is combined with the lower surface of the first storage cistern 10. The combined cartridge filter 42 is extended to the inside of the second storage cistern 20.

An inlet hole is formed at the upper portion of the cartridge filter 42 in order to flow in upper water and a discharge hole is formed at the lower portion of the cartridge filter 42 in order to discharge the inflowing water.

A carbon filter, an ion-exchange resin, and silicon dioxide, zeolite, barley stone mineral for purifying water, which are required for purifying water, are stacked or mixed between the inlet hole and the discharge hole.

The inflow water into the cartridge filter 42 through the ceramic filter 41 passes through in turn the carbon filter and ion-exchange resin and various components for purifying water and then flowing into the second storage cistern 20.

The mineral filter 43 is equipped with a lower side of the second storage cistern 20. Germanium stones and barley stones are equipped with the inside of the mineral filter 43.

Accordingly, water stored to the second storage cistern is always contacted with the mineral filter, thereby inhibiting increase of bacteria and various mineral ions are flowing out and melted out from the mineral filter. When a nozzle 21 equipped with the outside of the water purifier is opened, the water stored to the second storage cistern 20 is discharged.

The material of the filter 40 is formed by a forming product containing nano silver in order to have a sterilization force. Also, the first storage cistern 10 and the second storage cistern 20 are formed by a forming product containing nano silver in order to have a sterilization force.

Hereinafter, the construction of material of the ceramic filter 41, the cartridge filter 42, and the mineral filter 43 for constructing the filter 40 will be described.

The ceramic filter 41 is formed as a mixture by mixing the conventional used silicon dioxide ($SiO_2$) with its particle size of 1~100 micrometer with additionally one or two or more selected among silicon dioxide, tungsten, alumina ($Al_2O_3$), silver, zinc (Zn), white gold (PT), gold (Au), and titanium dioxide ($TiO_2$) with nano particle size, FIG. 2 is a TEM (Transmission Electron Microscope) photograph showing the distribution of nano particles of silicon dioxide according to an embodiment of the present invention.

The particle size of silicon dioxide is 1-100 nanometer and its use concentration is 1-1000 ppm. The nano particle silicon dioxide has effects such as an anti-bacterial effect, a sterilization effect, and a discoloration prevention effect.

FIG. 3 is a TEM (Transmission Electron Microscope) photograph showing the distribution of nano particles of tungsten according to an embodiment of the present invention.

The particle size of tungsten is 0.5-50 nanometer and its use concentration is 1-500 ppm. The nano particle tungsten has effects such as an anti-bacterial effect and a sterilization effect.

FIG. 4 is a TEM (Transmission Electron Microscope) photograph showing the distribution of nano particles of alumina according to an embodiment of the present invention.

The particle size of alumina is 1-100 nanometer and its use concentration is 50-500 ppm. The nano particle alumina has effects such as an anti-bacterial effect and a sterilization effect.

FIG. 5 is a TEM (Transmission Electron Microscope) photograph showing the distribution of nano particles of silver according to an embodiment of the present invention.

The particle size of silver is 1-10 nanometer and its use concentration is 5-50 ppm.

The nano particle silver has effects such as an anti-bacterial effect, a sterilization effect, and an anti-microbial effect.

FIG. 6 is a TEM (Transmission Electron Microscope) photograph showing the distribution of nano particles of zinc according to an embodiment of the present invention.

The particle size of zinc is 1-100 nanometer and its use concentration is 50-500 ppm. The nano particle zinc has effects such as an anti-bacterial effect and a sterilization effect.

FIG. 7 is a TEM (Transmission Electron Microscope) photograph showing the distribution of nano particles of white gold according to an embodiment of the present invention.

The particle size of white gold is 1-50 nanometer and its use concentration is 1-10 ppm. The nano particle white gold has effects such as an anti-bacterial effect, a sterilization effect, and a deodorization effect.

FIG. 8 is a TEM (Transmission Electron Microscope) photograph showing the distribution of nano particles of gold according to an embodiment of the present invention.

The particle size of gold is 1-20 nanometer and its use concentration is 1-10 ppm. The nano particle gold has effects such as a deodorization effect and a water purification effect.

FIG. 9 is a TEM (Transmission Electron Microscope) photograph showing the distribution of nano particles of titanium dioxide according to an embodiment of the present invention.

The particle size of titanium dioxide is 1-100 nanometer and its use concentration is 50-500 ppm. The nano particle titanium dioxide is the Anatase type, so that when it gets the ultraviolet light, a sterilization effect, an anti-bacterial effect, and an organic matter decomposition effect through an oxidation-reduction reaction.

The ceramic filter is formed by mixing the conventional used silicon dioxide with its particle size of 1~100 micrometer with additionally one or two or more selected among silicon dioxide, tungsten, alumina ($Al_2O_3$), silver, zinc (Zn), white gold (PT), gold (Au), and titanium dioxide ($TiO_2$) with nano particle size. And, in this state, the mixture is formed by a press and thereafter processed through plastic working by about 400 1,000 degrees of Celsius in temperature.

The ceramic filter formed by mixing the conventional used silicon dioxide with its particle size of 1~100 micrometer with additionally one or two or more selected among silicon dioxide, tungsten, alumina (Al2O3), silver, zinc (Zn), white gold (PT), gold (Au), and titanium dioxide (TiO2) with nano particle size has effects such as an anti-bacterial effect, a sterilization effect, a deodorization effect, an organic matter decomposition effect, an anti-microbial effect, and a water purification effect.

The reason why the multiple nano materials with the superposed anti-bacterial and sterilization forces are used as the ceramic filter 41 is because in every materials, an anti-bacterial force and a sterilization force are different to various types of bacteria each other so that the uniform anti-bacterial and sterilization forces can be applied within more rapid time.

In a cartridge filter 42, a silver-coated carbon filter is equipped with its inside and the silver coated on the surface of the carbon filter is formed by silver nano particles with the size of 1-10 nanometer and coated by the concentration of 5-150 ppm.

In the carbon filter, the surface treatment of silver is performed and at the state, manufactured by plastic working. When the surface treatment of silver is performed at the carbon filter, the carbon filter has effects such as a sterilization effect, an anti-bacterial effect, and an anti-microbial effect.

In the mineral filter, one or two or more among silver (Ag), white gold (PT), and gold (Au) are mixed selectively with the mineral containing barley stone, and then the mineral filter is coated by surface-treatment through the mixture, and the surface-treatment method is performed by a method disclosed in the conventional technique (Korean Invention Patent No. 10-0767737).

In nano particles to be used, the particle size of silver (Ag) is 1-10 nm (nanometer) and its use concentration is 50-200 ppm, the particle size of white gold (PT) is 1-50 nm (nanometer) and its use concentration is 1-10 ppm, and the particle size of gold (Au) is 1-20 nm (nanometer) and its use concentration is 1-10 ppm.

The mineral containing barley stone is an amorphous type and its diameter is the size of 3~1,000 mm (millimeter). It is first dried by the method disclosed at the conventional art (Korean Invention Patent No. 10-0767737) and the moisture of the inside thereof is removed. Thereafter, the mineral is quenched in water in which one or two or more among silver, white gold, and gold are mixed, so that nano particles are infiltrated into air holes of the mineral of barley stone and then its surface is treated.

In the water purifier of the present invention, water is flowing into the first storage cistern 1 and stored. The stored water, as described above, is firstly sterilized by the first storage cistern 10 and the ceramic filter 41 as plastic forming products containing nano materials manufactured by the method disclosed in the conventional art of Korean Invention Patent No. 10-0599532.

The water stored to the first storage cistern 10 is flowing into a carbon filter through the cartridge filter 42, purified and sterilized, and thereafter flowing into the second storage cistern 20. The flowing water from the first storage cistern 10 to the second storage cistern 20 through the carbon filter is secondly sterilized by the carbon filter 42 which is surface-treated by nano silver.

The flowing water of the second storage cistern 20 is thirdly sterilized by the second storage cistern 20 and the mineral filter 43 as anti-bacterial plastic forming products manufactured by the method disclosed in the conventional art of Korean Invention Patent No. 10-0599532.

The sterilized and stored water, as described above, is discharged by a nozzle 11 formed at the outside of the second storage cistern 20.

In the water purifier according to the present invention, the storage cistern and the filter are formed by a nano complex body with an anti-bacterial force, so that microorganisms such as bacteria within the water stored to the water purifier are sterilized.

FIG. 10 is an anti-bacterial test table of a water purifier according to the present invention.

FIG. 11 shows a specification of a test water purifier according to the present invention.

The FIG. 10 shows that: in the water purifier according to the present invention, *staphylococcus aureus* and colon bacterium are injected into the water to be purified and thereafter the numerical values of the detected *staphylococcus aureus* and colon bacterium are compared.

In a test method, the numerical values of *staphylococcus aureus* and colon bacterium in the purified water 100 ml, 500 ml, and 1 L are measured.

As described in the table, in the state that *staphylococcus aureus* of 18,000,000 and colon bacterium of 16,000,000 are included into the water to be purified, the water of 100 ml, 500 ml, and 1 L purified through a ceramic filter 41, a cartridge filter 42, and a mineral filter 43 are tested and as a result, the bacteria of 99.7~99.8% (percentage) are sterilized as shown in the table.

In the anti-bacterial force of the ceramic filter 41, in the state that *staphylococcus aureus* of 180,000 and colon bacterium of 160,000 are included into the water to be purified, the water of 100 ml, 500 ml, and 1 L purified through a ceramic filter 41, a cartridge filter 42, and a mineral filter 43 are tested and as a result, the bacteria of 99.9% (percentage) are sterilized as shown in the FIG. 10.

In the anti-bacterial force of the cartridge filter 42, in the state that *staphylococcus aureus* of 160,000 and colon bacterium of 190,000 are included into the water to be purified, the water of 100 ml, 500 ml, and 1 L purified through a ceramic filter 41, a cartridge filter 42, and a mineral filter 43 are tested and as a result, the bacteria of 99.9% (percentage) are sterilized as shown in the FIG. 10.

In the anti-bacterial force of the mineral filter 43, in the state that *staphylococcus aureus* of 160,000 and colon bacterium of 190,000 are included into the water to be purified, when an anti-bacterial process is performed by only using a mineral filter 43, the anti-bacterial process is continually performed by time unit for 1 hour and then the bacteria of 68.3~70.5% (percentage) are sterilized. After three hours, the bacteria of 91.3~93.8% (percentage) are sterilized. After five hours, the bacteria of 99.4~99.7% (percentage) are sterilized.

Accordingly, in an area such as Africa and so on in which there is no electricity and water is scarce, people use the sterilized water as drinking water and so can be prevented from various waterborne infection due to rainwater and the water of a brook.

Although the present invention has been described in connection with the exemplary embodiments illustrated in the drawings, it is only illustrative. It will be understood by those skilled in the art that various modifications and equivalents can be made to the present invention. Therefore, the true technical scope of the present invention should be defined by the appended claims.

The invention claimed is:

1. In a water purifier including a first storage cistern in which an inlet for flowing in water is formed, a second storage cistern for storing the purified water and having a nozzle at the outside thereof, and a filter system comprising a ceramic filter, a cartridge filter, and a mineral filter installed in the first storage cistern and the second storage cistern to filter water in the first storage cistern and make the purified water in the second storage cistern, the ceramic filter formed from a mixture of (a) conventional used silicon dioxide with particles size of 1-100 micrometer and (b) nanoparticles comprising silicon dioxide, tungsten, alumina, and titanium dioxide, wherein each particle size and concentration of the nanoparticles in the mixture within the ceramic filter are as follows:

the particle size of the silicon dioxide nanoparticles is 1-100 nanometer and its use concentration is 10-1000 ppm, the particle size of tungsten nanoparticles is 0.5-50 nanometer and its use concentration is 1-500 ppm, the particle size of alumina nanoparticles is 1-100 nanometer and its use concentration is 50-500 ppm, and the particle size of the titanium dioxide nanoparticles is 1-100 nanometer and its use concentration is 50-500 ppm; and the cartridge filter comprising a silver-coated carbon filter, wherein the silver coated on the surface of the carbon filter is formed by silver nanoparticles with the size of 1-10 nanometer and coated in a concentration of 5-150 ppm.

2. The water purifier of claim 1, wherein the mineral filter is installed at the bottom of the second storage cistern, wherein silver (Ag), platinum, (PT), and gold (Au), are mixed selectively with mineral to form the mineral filter, wherein the particle size of silver (Ag) is 1-10 nm (nanometer) and its use concentration is 50-200 ppm, the particle size of platinum (PT) is 1-50 nm (nanometer) and its used concentration is 1-10 ppm, and the particle size of gold (Au) is 1-20 nm (nanometer) and its use concentration is 1-10 ppm.

* * * * *